United States Patent
Wass et al.

(10) Patent No.: US 10,602,561 B2
(45) Date of Patent: Mar. 24, 2020

(54) SUPPORT CAPABILITY IN COMMUNICATIONS NETWORKS FOR CS/PS COORDINATION

(71) Applicant: Telefonaktiebolaget LM Ericsson (publ), Stockholm (SE)

(72) Inventors: Mikael Wass, Sätila (SE); Peter Ramle, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 15/325,823

(22) PCT Filed: Sep. 5, 2014

(86) PCT No.: PCT/EP2014/068971
§ 371 (c)(1),
(2) Date: Jan. 12, 2017

(87) PCT Pub. No.: WO2016/034248
PCT Pub. Date: Mar. 10, 2016

(65) Prior Publication Data
US 2017/0142772 A1 May 18, 2017

(51) Int. Cl.
*H04W 76/16* (2018.01)
*H04W 88/18* (2009.01)
(Continued)

(52) U.S. Cl.
CPC .......... *H04W 76/16* (2018.02); *H04L 5/0055* (2013.01); *H04W 24/02* (2013.01); *H04W 48/18* (2013.01);
(Continued)

(58) Field of Classification Search
CPC ..... H04W 76/16; H04W 24/02; H04W 48/18; H04W 72/048; H04W 88/18; H04L 5/0055; H04M 7/1235
See application file for complete search history.

(56) References Cited

U.S. PATENT DOCUMENTS

2009/0168675 A1 7/2009 Tao
2009/0213834 A1 8/2009 Amirijoo et al.
(Continued)

OTHER PUBLICATIONS

3GPP, TS Group GSM/EDGE RAN—SGSN BSS GPRS Protocol, TS 48.018 v12.2.0, Mar. 2014, Entire document (Year: 2014).*
(Continued)

*Primary Examiner* — Robert Scheibel
(74) *Attorney, Agent, or Firm* — Withrow & Terranova, PLLC

(57) ABSTRACT

There is provided a method for providing support capability of a core network (CN) node. The method is performed by the CN node. The method comprises setting up a connection to a radio access network (RAN) node. The method comprises, in response thereto, providing an indication regarding whether the CN node supports at least one of operator coordinated area (OCA) and query to the RAN node, according to which indication the CN node provides information to be used by the RAN node for selecting a serving operator such that the same operator is selected for the wireless device in both Circuit Switched (CS) domain and in Packet Switch (PS) domain.

24 Claims, 5 Drawing Sheets

(51) Int. Cl.
- H04W 24/02 (2009.01)
- H04W 48/18 (2009.01)
- H04L 5/00 (2006.01)
- H04W 72/04 (2009.01)
- H04M 7/12 (2006.01)

(52) U.S. Cl.
CPC ......... *H04W 72/048* (2013.01); *H04W 88/18* (2013.01); *H04M 7/1235* (2013.01)

(56) References Cited

U.S. PATENT DOCUMENTS

| | | | |
|---|---|---|---|
| 2010/0027470 A1* | 2/2010 | Patanapongpibul | H04W 76/12 370/328 |
| 2013/0170465 A1* | 7/2013 | Schliwa-Bertling | H04W 72/048 370/329 |
| 2013/0195009 A1* | 8/2013 | Ramle | H04W 36/0022 370/328 |
| 2013/0250894 A1 | 9/2013 | Zhang et al. | |

OTHER PUBLICATIONS

Author Unknown, "Technical Specification Group Radio Access Network; UTRAN Iu interface Radio Access Network Application Part (RANAP) signalling (Release 12)," Technical Specification 25.413, Version 12.2.0, 3GPP Organizational Partners, Jun. 2014, 441 pages.

Author Unknown, "Technical Specification Group GSM/EDGE Radio Access Network; Mobile Switching Centre Base Station System (MSC-BSS) interface; Layer 3 specification (Release 11)," Technical Specification 48.008, Version 11.7.0, 3GPP Organizational Partners, Nov. 2013, 227 pages.

Author Unknown, "Technical Specification Group Services and System Aspects; Study on CS/PS Coordination in shared network; Stage 2; Release 13," Technical Report 23.704, Version 1.1.0, 3GPP Organizational Partners, Jul. 2014, 129 pages.

Author Unknown, "Technical Specification Group Services and System Aspects; Network Sharing; Architecture and functional description (Release 12)," Technical Specification 23.251, Version 12.1.0, 3GPP Organizational Partners, Jun. 2014, 35 pages.

Author Unknown, "Technical Specification Group GSM/EDGE Radio Access Network; General Packet Radio Service (GPRS); Base Station System (BSS)—Serving GPRS Support Node (SGSN); BSS GPRS Protocol (BSSGP) (Release 12)," Technical Specification 48.018, Version 12.2.0, 3GPP Organizational Partners, Mar. 2014, 190 pages.

Author Unknown, "TD SP-140115: New WID on improvements to CS/PS coordination in UTRAN/GERAN Shared Networks," 3rd Generation Partnership Project (3GPP), Work Item, TSG SA Meeting #63, Mar. 5-7, 2014, 4 pages, Fukuoka, Japan.

International Search Report and Written Opinion for International Patent Application No. PCT/EP2014/068971, dated Jun. 3, 2015, 10 pages.

Extended European Search Report for European Patent Application No. 18175118.1, dated Aug. 8, 2018, 9 pages.

Ericsson, "S2-142537: Merged solution for CSPS coordination issues," 3rd Generation Partnership Project (3GPP), SA WG2 Meeting #104, Jun. 7-11, 2014, 5 pages, Dublin, Ireland.

First Office Action for Chinese Patent Application No. 201480081588.6, dated Sep. 4, 2019, 13 pages.

* cited by examiner

SUPPORT CAPABILITY IN COMMUNICATIONS NETWORKS FOR CS/PS COORDINATION

This application is a 35 U.S.C. § 371 national phase filing of International Application No. PCT/EP2014/068971, filed Sep. 5, 2014, the disclosure of which is incorporated herein by reference in its entirety.

TECHNICAL FIELD

Embodiments presented herein relate to support capability in communications networks, and particularly to methods, a core network node, a radio access network node, computer programs, and a computer program product for providing or receiving support capability of the core network node.

BACKGROUND

In communications networks, there may be a challenge to obtain good performance and capacity for a given communications protocol, its parameters and the physical environment in which the communications network is deployed.

For example, the use of Multi-Operator Radio Access Networks (MORANs), also known as Radio Access Network (RAN) sharing, and Multiple Operator Core Network (MOCN) are ways for multiple mobile telephone network operators to share radio access network infrastructure. The same network infrastructure may thus be used to transmit/receive for different operators. A management information base (MIB) may contain a list of multiple public land mobile network (PLMN) Identities. The wireless device (or user equipment, UE) may read the MIB and select a PLMN to register to, based on its subscription. A wireless device that does not support network sharing in the sense that it ignores the additional broadcast system information that is specific for network sharing is denoted a non-supporting wireless device or a network sharing non-supporting UE. A wireless device that supports network sharing in the sense that it is able to select a core network operator as the serving operator within a shared network is denoted a supporting wireless device or a network sharing supporting UE.

One task in a MOCN network is the selection of a serving core network (CN) operator. In a Long Term Evolution (LTE) network, this simply means that a serving operator needs to be selected for the UE in the packet switched (PS) domain. In the Global System for Mobile Communications (GSM) and in Wideband Code Division Multiple Access (WCDMA) networks, however, it needs to be ensured that the same serving operator is selected for the UE in both the circuit switched (CS) domain and the PS domain, thus resulting in so-called CS/PS coordination.

For a wireless device in idle mode, mobility selection of the serving CN operator is done either directly or indirectly. The mobility selection of the serving CN operator is done directly by the UE if the UE is a supporting UE and if the RAN and the CN also supports supporting UEs. The mobility selection of the serving CN operator is done indirectly by using the MOCN redirection function in the RAN and CN if the UE is a non-supporting UE or if the RAN and the CN does not support supporting UEs.

The current release of the 3rd Generation Partnership Project (3GPP) standard (TS 23.251 v12.1.0) does however not guarantee, for all mobility scenarios, that the same operator is selected in both the CS and the PS domains. For that reason a work has been initiated in 3GPP (see WID SP-140168 Improvements to CS/PS coordination in UTRAN/GERAN Shared Networks) with the following justification where it is noted that there is support of Network Sharing in UTRAN/GERAN specifications where radio access and core network can be shared between operators without this being known to the UEs. One challenge in the context of this functionality is to ensure that the registration of a given UE to the CS and PS domain is coordinated, i.e. a subscriber is registered to the same PLMN in both domains. UTRAN is short for Universal Terrestrial Radio Access Network and GERAN is short for GSM EDGE RAN, where EDGE is short for Enhanced Data Rates for GSM Evolution. It is in WID SP-140168 Improvements to CS/PS coordination in UTRAN/GERAN Shared Networks further noted that initial analysis has shown that there are issues with CS/PS coordination in least in the case of network-controlled mobility into UTRAN/GERAN shared networks i.e. CS/PS coordination failure resulting in UE ending up registered to different operators in the CS and PS domains.

Recently this has resulted in a 3GPP TR 23.704 v 1.1.0 and within that an agreement to base the normative CRs upon solution #5; see Chapter 8, Conclusion where it is stated that it is concluded based on evaluation of solutions in section 7 that solution #5 is selected as the basis for further normative work. Further work will occur via normative CRs and there will be no further additions, alignments or corrections to the technical report.

Solution #5 (see Chapter 7.5 in TR 23.704) includes among other things a procedure in which CS/PS coordination for some scenarios is performed by the RAN node based on data (old location area identity (LAI) or routing area identification (RAI), CS/PS-network resource indication (NRI) and indication if UE is attaching) provided by the CN node in both the CS and the PS domain. By use of this data it is possible to conclude whether the UE is roaming within an operator coordinated area and thus can be regarded as CS/PS coordinated. When serving operator is selected based on the operator coordinated area this must be applied for both CS and PS domain.

The above described procedure will work properly when all network nodes (such as base station controller BSC, radio network controller RNC, serving GPRS support node SGSN, and mobile switching centre MSC) are upgraded and thereby capable of providing data (the SGSN and the MSC) or capable of acting upon the provided data (the BSC or the RNC). However as stated above the concept of operator coordinated area must be applied in both the CS and PS domain or not at all. And since registration in the PS domain (for routing area update, RAU) and in the CS domain (for location area update, LAU) is not always concurrent it is not possible to check the support level during a registration procedure. For example if the RAN node and the SGSN node supports the new procedure whilst the MSC does not and RAU occur first, then it will not be ok to apply the new procedure for the PS domain as it will not be possible to apply it for the CS domain.

For other scenarios CS/PS coordination is performed by the RAN node based on queries sent to the CN nodes in the CS and the PS domain. Similarly this must be supported in both the CS and the PS domain or not at all.

Hence, there is still a need for an improved provision of support capability in communications networks.

SUMMARY

An object of embodiments herein is to provide efficient provision of support capability in communications networks.

The inventors of the enclosed embodiments have realized that the RAN node must be aware of the support level in the MSC and the SGSN before the first registration attempt, i.e., already directly after setup of the connection between these nodes. The inventors of the enclosed embodiments have realized that this is not supported in the current standard.

According to a first aspect there is presented a method for providing support capability of a core network (CN) node. The method is performed by the CN node. The method comprises setting up a connection to a radio access network (RAN) node. The method comprises, in response thereto, providing an indication regarding whether the CN node supports at least one of operator coordinated area (OCA) and query to the RAN node according to which indication the CN node provides information to be used by the RAN node for selecting a serving operator such that the same operator is selected for the wireless device in both Circuit Switched, CS, domain and in Packet Switch, PS, domain.

Advantageously this provides efficient provision of support capability in communications networks.

Advantageously this makes it possible to use the newly agreed procedure of CS/PS coordination without having to rely upon configuration. Configuration in a shared network including RAN nodes and CN nodes from both CS and PS domains, and on top of that, from two or more sharing operators is an industrious and error prone procedure as it would involve a lot of synchronization between the operators and between the CS and PS domains.

According to a second aspect there is presented a core network (CN) node for providing support capability of the CN node. The CN node comprises a processing unit. The processing unit is configured to set up a connection to a radio access network (RAN) node. The processing unit is configured to, in response thereto, provide an indication regarding whether the CN node supports at least one of operator coordinated area (OCA) and query to the RAN node according to which indication the CN node provides information to be used by the RAN node for selecting a serving operator such that the same operator is selected for the wireless device in both Circuit Switched, CS, domain and in Packet Switch, PS, domain.

According to a third aspect there is presented a computer program for providing support capability of a core network (CN) node, the computer program comprising computer program code which, when run on a processing unit of the CN node, causes the CN node to perform a method according to the first aspect.

According to a fourth aspect there is presented a method for receiving support capability of a core network (CN) node. The method is performed by a radio access network (RAN) node. The method comprises setting up a connection to the CN node. The method comprises, in response thereto, receiving an indication regarding whether the CN node supports at least one of operator coordinated area (OCA) and query from the CN node according to which indication the CN node provides information to be used by the RAN node for selecting a serving operator such that the same operator is selected for the wireless device in both Circuit Switched, CS, domain and in Packet Switch, PS, domain. The method comprises storing the received indication together with identity information of the CN node.

According to a fifth aspect there is presented a radio access network (RAN) node for receiving support capability of a core network (CN) node. The RAN node comprises a processing unit. The processing unit is configured to set up a connection to the CN node. The processing unit is configured to, in response thereto, receive an indication regarding whether the CN node supports at least one of operator coordinated area (OCA) and query from the CN node according to which indication the CN node provides information to be used by the RAN node for selecting a serving operator such that the same operator is selected for the wireless device in both Circuit Switched, CS, domain and in Packet Switch, PS, domain. The processing unit is configured to store the received indication together with identity information of the CN node.

According to a sixth aspect there is presented a computer program for receiving support capability of a core network (CN) node, the computer program comprising computer program code which, when run on a processing unit of a RAN node, causes the RAN node to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth, and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
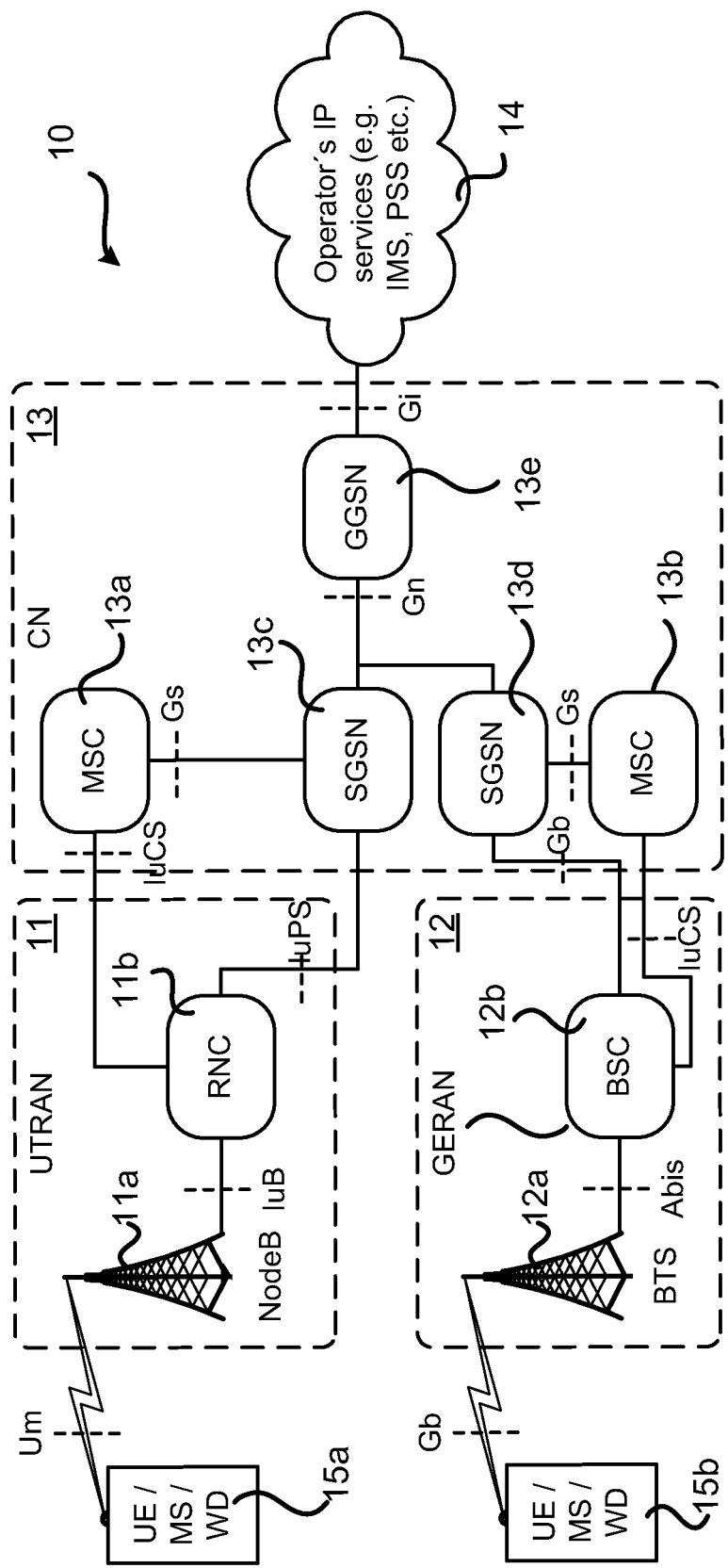
FIG. 1 is a schematic diagram illustrating a communication network according to embodiments.

FIG. 1 shows a schematic illustration of an exemplifying communications network 10. The communications network 10 comprises a first radio access network (RAN) 11 in the form of a UTRAN and a second RAN 12 in the form of a GERAN. The first RAN 11 comprises radio access network nodes in the form of a NodeB and an RNC 11b. The second RAN 12 comprises radio access network nodes in the form of a base transceiver station (BTS) 12a and a BSC 12b. The RANs 11, 12 are operatively connected to a core network (CN) 13. In this respect, although the schematic illustration shows only one CN 13, it is readily understood that in multi operator core network (MOCN) scenarios at least two CNs 13 (one for each operator, or service provider) are operatively connected to the RANs 11 and/or 12. The CN 13 comprises core network nodes in the form of mobile switching centres 13a, 13b, SGSNs 13c, 13d, and a GGSN 13e. in this respect a serving gateway (SGW) and/or a packet data network gateway (PGW) may replace the GGSN in case an S3/S4 architecture is used. The CN 13 is in turn operatively connected to a service and data providing Internet Protocol (IP) based network 14. Wireless devices 15a, 15b such as user equipment (UE), mobile stations (MS), and wireless devices (WD) are thereby enabled to access the service and data provided by the network 14 by establishing a wireless connection to one of the RANs 11, 12.

The GGSN 13e is responsible for the interworking between the GPRS core network 13 and the external packet data network 14 providing operator's IP services, such as the Internet and X.25 networks. The GGSN 13e is the anchor point that enables the mobility of the wireless devices 15a, 15b in the GPRS/UMTS networks and it may be seen as the GPRS equivalent to the Home Agent in Mobile IP. It maintains routing necessary to tunnel the Protocol Data Units (PDUs) to the SGSN 13c, 13d that services a particular wireless device 15a, 15b. The GGSN 13e converts the GPRS packets coming from the SGSN 13c, 13d into the appropriate packet data protocol (PDP) format (e.g., IP or X.25) and sends them out on the corresponding packet data network 14. In the other direction, PDP addresses of incoming data packets are converted to the GSM address of the destination user. The readdressed packets are sent to the responsible SGSN 13c, 13d. The GGSN 13e is responsible for IP address assignment and is the default router for the connected wireless devices 15a, 15b. The GGSN 13e also performs authentication and charging functions. Other functions include subscriber screening, IP Pool management and address mapping, QoS and PDP context enforcement.

The SGSN 13c, 13d is responsible for the delivery of data packets from and to the wireless devices 15a, 15b within its geographical service area. Its tasks include packet routing and transfer, mobility management (attach/detach and location management), logical link management, and authentication and charging functions. The location register of the SGSN 13c, 13d stores location information (e.g., current cell, current Visitor Location Register (VLR)) and user profiles (e.g., International Mobile Station Identity (IMSI), address(es) used in the packet data network) of all GPRS users registered with this SGSN 13c, 13d.

The mobile switching centre 13a, 13b (commonly abbreviated as MSC Server or MSS) is a GSM core network element which controls the network switching subsystem elements.

The RNC 11b is a node in the UMTS radio access network (UTRAN) 11 and is responsible for controlling the NodeBs 11a that are operatively connected to it. The RNC 11b carries out radio resource management, some of the mobility management functions and is the point where encryption is done before user data is sent to and from the wireless device 15a. The RNC 11b is operatively connected to a Circuit Switched domain of the Core Network through a Media Gateway (MGW) and to the SGSN 13c in the Packet Switched Core Network.

The BSC 12b is a node in the GSM Radio Access Network (GERAN) 12 and is responsible for controlling the BTSs 12a that are connected to it. The BSC 12b carries out radio resource management and some of the mobility management functions.

A skilled person having the benefit of this disclosure realizes that vast number of well known wireless devices 15a, 15b can be used in the various embodiments of the present disclosure. The wireless devices 15a, 15b may e.g. be a cell phone device or similar, e.g. such as a mobile phone, a handset, a wireless local loop phone, a smartphone, a laptop computer, a tablet computer, etc., e.g. defined by the standards provided by the 3GPP. Thus, the wireless device 15a, 15b needs no detailed description as such. However, it should be emphasized that the wireless devices 15a, 15b may be embedded (e.g. as a card or a circuit arrangement or similar) in and/or attached to various other devices, e.g. such as various laptop computers or tablets or similar or other mobile consumer electronics or similar, or vehicles or boats or air planes or other movable devices, e.g. intended for transport purposes. Indeed, the wireless devices 15a, 15b may even be embedded in and/or attached to various semi-stationary devices, e.g. domestic appliances or similar, or consumer electronics such as printers or similar having a semi-stationary mobility character.

The embodiments disclosed herein relate to support capability in communications networks. In order to provide support capability in communications networks there is provided a CN node 13a, 13b, 13c, 13d, methods performed by the CN node 13a, 13b, 13c, 13d, a computer program comprising code, for example in the form of a computer program product, that when run on a processing unit of the CN node 13a, 13b, 13c, 13d, causes the CN node 13a, 13b, 13c, 13d to perform the method. In order to receive support capability in communications networks there is provided a RAN node 11b, 12b, methods performed by the RAN node 11b, 12b, a computer program comprising code, for example in the form of a computer program product, that when run on a processing unit of the RAN node 11b, 12b, causes the RAN node 11b, 12b to perform the method.

Figure 2A:
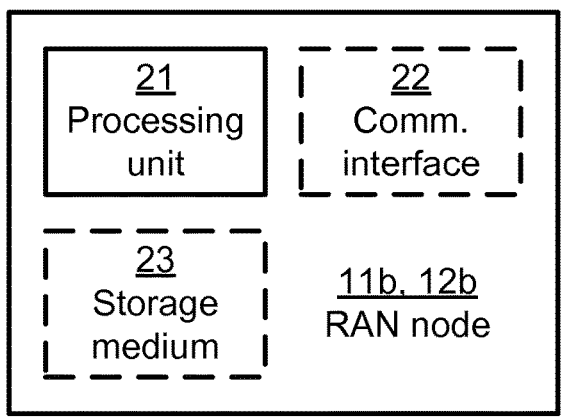
FIG. 2a is a schematic diagram showing functional units of a radio access network node according to an embodiment.

FIG. 2a schematically illustrates, in terms of a number of functional units, the components of a RAN node 11b, 12b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 23. Thus the processing unit 21 is thereby arranged to execute methods as herein disclosed. The storage medium 23 may also comprise persistent storage, which, for example, can be any single one or combination of magnetic memory, optical memory, solid state memory or even remotely mounted memory. The RAN node 11b, 12b may further comprise a communications interface 22 for communications with a CN node 13a, 13b, 13c, 13d and other RAN nodes 11a, 12a. The processing unit 21 controls the general operation of the RAN node 11b, 12b e.g. by sending data and control signals to the communications interface 22 and the storage medium 23, by receiving data and reports from the communications interface 22, and by retrieving data and instructions from the storage medium 23. Other components, as well as the related functionality, of the RAN node 11b, 12b are omitted in order not to obscure the concepts presented herein.

Figure 2B:
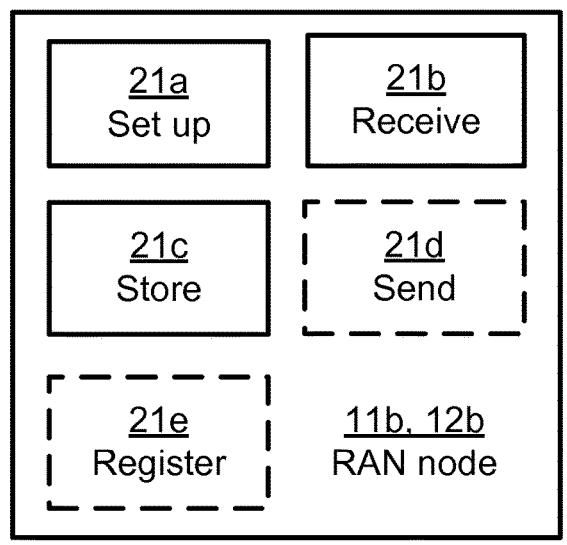
FIG. 2b is a schematic diagram showing functional modules of a radio access network node according to an embodiment.

FIG. 2b schematically illustrates, in terms of a number of functional modules, the components of a RAN node 11b, 12b according to an embodiment. The RAN node 11b, 12b of FIG. 2b comprises a number of functional modules; a set up module 21a, a receive module 21b, and a store module 21c. The RAN node 11b, 12b of FIG. 2b may further comprises a number of optional functional modules, such as any of a send module 21d and a register module 21e. The functionality of each functional module 21a-e will be further disclosed below in the context of which the functional modules 21a-e may be used. In general terms, each functional module 21a-e may be implemented in hardware or in software. Preferably, one or more or all functional modules 21a-e may be implemented by the processing unit 21, possibly in cooperation with functional units 22 and/or 23. The processing unit 21 may thus be arranged to from the storage medium 23 fetch instructions as provided by a functional module 21a-e and to execute these instructions, thereby performing any steps as will be disclosed hereinafter.

Figure 3A:
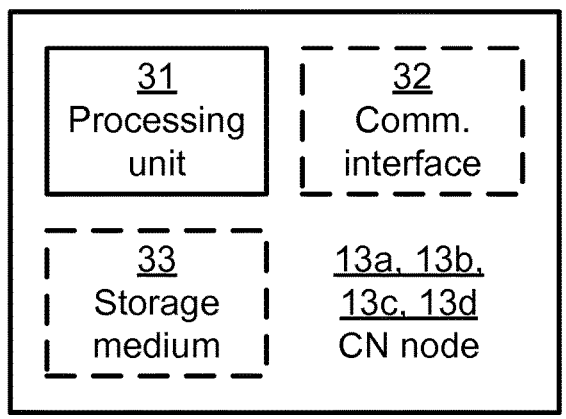
FIG. 3a is a schematic diagram showing functional units of a core network node according to an embodiment.

FIG. 3a schematically illustrates, in terms of a number of functional units, the components of a CN node 13a, 13b, 13c, 13d according to an embodiment. A processing unit 31 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 41a (as in FIG. 4), e.g. in the form of a storage medium 33. Thus the processing unit 31 is thereby arranged to execute methods as herein disclosed. The storage medium 33 may also comprise persistent storage, which, for example, can be any single one or combination of magnetic memory, optical memory, solid state memory or even remotely mounted memory. The CN node 13a, 13b, 13c, 13d may further comprise a communications interface 32 for communications with a RAN node 11b, 12b and other CN nodes 13a, 13b, 13c, 13d, 13e. The processing unit 31 controls the general operation of the CN node 13a, 13b, 13c, 13d e.g. by sending data and control signals to the communications interface 22 and the storage medium 33, by receiving data and reports from the communications interface 32, and by retrieving data and instructions from the storage medium 33. Other components, as well as the related functionality, of the CN node 13a, 13b, 13c, 13d are omitted in order not to obscure the concepts presented herein.

Figure 3B:
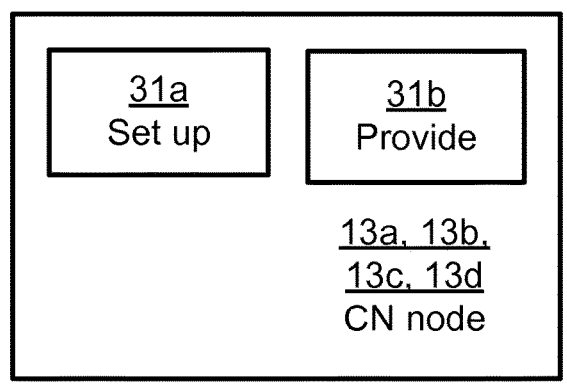
FIG. 3b is a schematic diagram showing functional modules of a core network node according to an embodiment.

FIG. 3b schematically illustrates, in terms of a number of functional modules, the components of a CN node 13a, 13b, 13c, 13d according to an embodiment. The CN node 13a, 13b, 13c, 13d of FIG. 3b comprises a number of functional modules; a set up module 31a, and a provide module 31b.

The CN node 13a, 13b, 13c, 13d of FIG. 3b may further comprises a number of optional functional modules. The functionality of each functional module 31a-b will be further disclosed below in the context of which the functional modules 31a-b may be used. In general terms, each functional module 31a-b may be implemented in hardware or in software. Preferably, one or more or all functional modules 31a-b may be implemented by the processing unit 31, possibly in cooperation with functional units 32 and/or 33. The processing unit 31 may thus be arranged to from the storage medium 33 fetch instructions as provided by a functional module 31a-c and to execute these instructions, thereby performing any steps as will be disclosed hereinafter.

Figure 4:
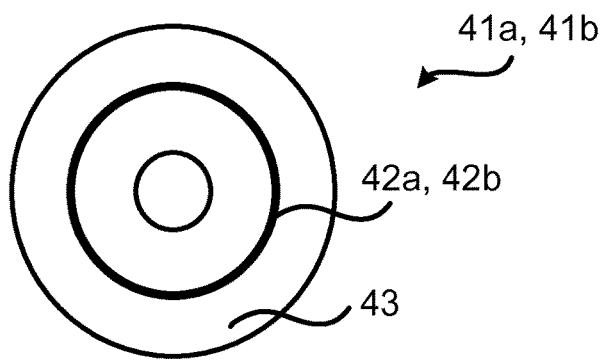
FIG. 4 shows one example of a computer program product comprising computer readable means according to an embodiment.

FIG. 4 shows one example of a computer program product 41a, 41b comprising computer readable means 43. On this computer readable means 43, a computer program 42a can be stored, which computer program 42a can cause the processing unit 21 and thereto operatively coupled entities and devices, such as the communications interface 22 and the storage medium 23, to execute methods as performed by the RAN node 11b, 12b according to embodiments described herein. On this computer readable means 43, a computer program 42b can be stored, which computer program 42b can cause the processing unit 31 and thereto operatively coupled entities and devices, such as the communications interface 32 and the storage medium 33, to execute methods as performed by the CN node 13a, 13b, 13c, 13d according to embodiments described herein. The computer program 42a, 42b and/or computer program product 41a, 41b may thus provide means for performing any steps as herein disclosed.

In the example of FIG. 4, the computer program product 41a, 41b is illustrated as an optical disc, such as a CD (compact disc) or a DVD (digital versatile disc) or a Blu-Ray disc. The computer program product 41a, 41b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 42a, 42b is here schematically shown as a track on the depicted optical disk, the computer program 42a, 42b can be stored in any way which is suitable for the computer program product 41a, 41b.

Figure 5:
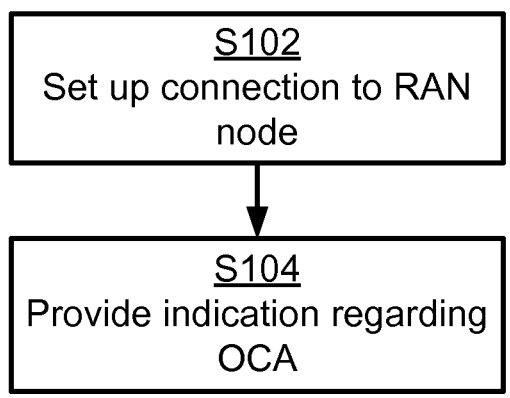
FIGS. 5, 6, 7, and 8 are flowcharts of methods according to embodiments.
Figure 6:
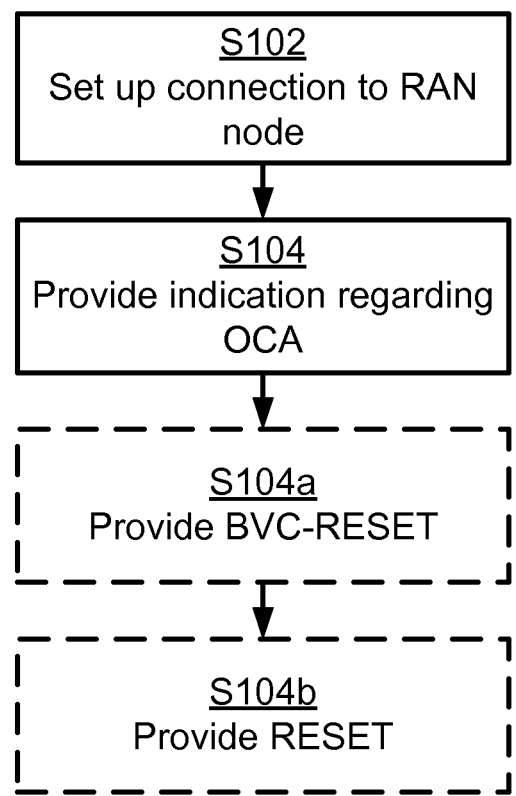
Figure 7:
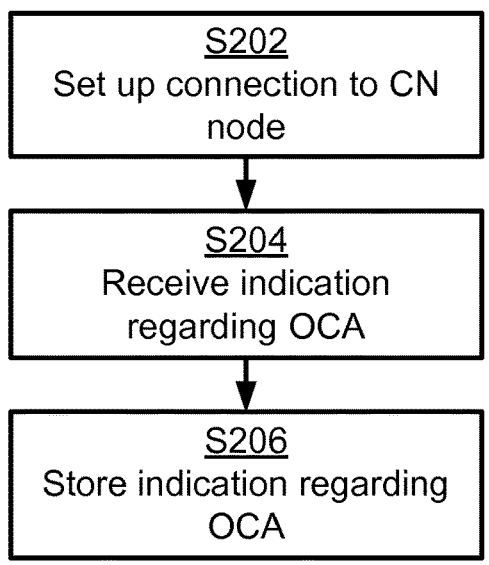
Figure 8:
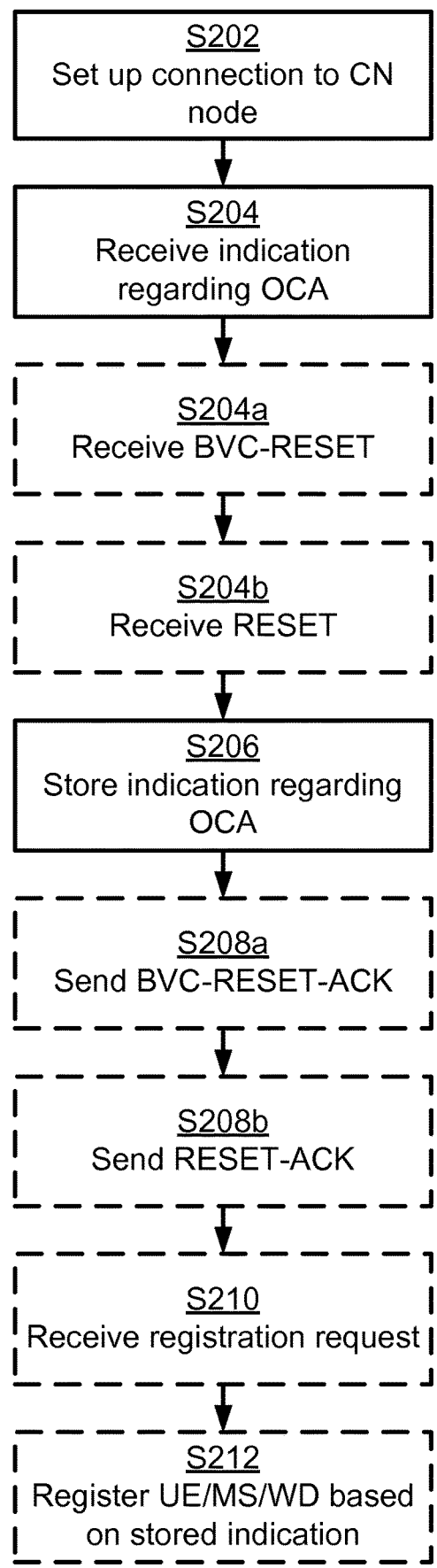

FIGS. 5 and 6 are flow chart illustrating embodiments of methods for providing support capability of the CN node 13a, 13b, 13c, 13d. The methods are performed by the CN node 13a, 13b, 13c, 13d. FIGS. 7 and 8 are flow chart illustrating embodiments of methods for receiving support capability of the CN node 13a, 13b, 13c, 13d. The methods are performed by the RAN node 11b, 12b. The methods are advantageously provided as computer programs 42a, 42b.

Reference is now made to FIG. 5 illustrating a method for providing support capability of the CN node 13a, 13b, 13c, 13d as performed by the CN node 13a, 13, 13c, 13d according to an embodiment. Parallel reference is made to the signalling diagram of FIG. 9.

S102: The CN node 13a, 13b, 13c, 13d sets up a connection to a radio access network (RAN) node 11b, 12b. Either the CN node 13a, 13b, 13c, 13d or the RAN node 11b, 12b may initiate the connection to be set up.

S104: The CN node 13a, 13b, 13c, 13d, in response to the connection having being set up in step S102, provides an indication regarding whether the CN node 13a, 13b, 13c, 13d supports at least one of operator coordinated area (OCA) and query to the RAN node 11b, 12b. According to the indication the CN node provides information to be used by the RAN node for selecting a serving operator such that the same operator is selected for the wireless device in both Circuit Switched, CS, domain and in Packet Switch, PS, domain.

In this respect, the OCA and query may be defined as an area for which an old LAI/CS-NRI (for the CS domain) and an old RAI/PS-NRI (for the PS domain) from sharing partners networks can always be mapped to an operator in the shared network.

Further, in terms of query, the RAN node 11b, 12b may for a (combined or non-combined) registration attempt in the PS domain query the CN nodes 13a, 13b in the CS domain whether a wireless device 15a, 15b is registered at any of the sharing operators in the CS domain or not. Similarly for a registration attempt in the CS domain the RAN node 11b, 12b may query the CN nodes 13c, 13d in the PS domain whether a wireless device 15a, 15b is registered at any of the sharing operators in the PS domain or not. For a registration attempt in the CS domain and if the wireless device 15a, 15b is not registered at any of CN nodes in the PS domain in the shared network 10 then the RAN node 11b, 12b may via the CN nodes 13c, 13d in the PS domain query all possible mobility management entities (MMEs) of the sharing operators whether the wireless device 15a, 15b is registered at any of the MMEs of the sharing operators. Registration in MME but not in the CS domain may occur at cell reselection from LTE for a wireless device 15a, 15b that is not registered with a CN node 13c, 13d.

The herein disclosed embodiments thereby ensure that the RAN node (BSC 12b or RNC 11b) is provided by the CN node (SGSN 13c, 13d and MSC 13a, 13b) capability regarding if they respectively support the concept of operator coordinated area (OCA) and query. As noted above, the capability is provided already directly after setup of the connection between the network nodes.

Embodiments relating to further details of providing support capability of the CN node 13a, 13b, 13c, 13d will now be disclosed.

There are different examples of RAN nodes. For example, the RAN node may be a base station controller (BSC) 12b, or a radio network controller (RNC) 11b.

There are different examples of CN nodes. For example, the CN node may be a serving general packet radio service support node (SGSN) 13c, 13d, or a mobile switching centre (MSC) 13a, 13b.

Reference is now made to FIG. 6 illustrating methods for providing support capability of the CN node 13a, 13b, 13c, 13d as performed by the CN node 13a, 13, 13c, 13d according to further embodiments. Parallel reference is continued to the signalling diagram of FIG. 9.

There may be different ways to provide the indication. Different embodiments relating thereto will now be described in turn.

The indication may be provided at initialization of the CN node. Additionally or alternatively the indication is provided at initialization of the RAN node.

Figures 9, 10:
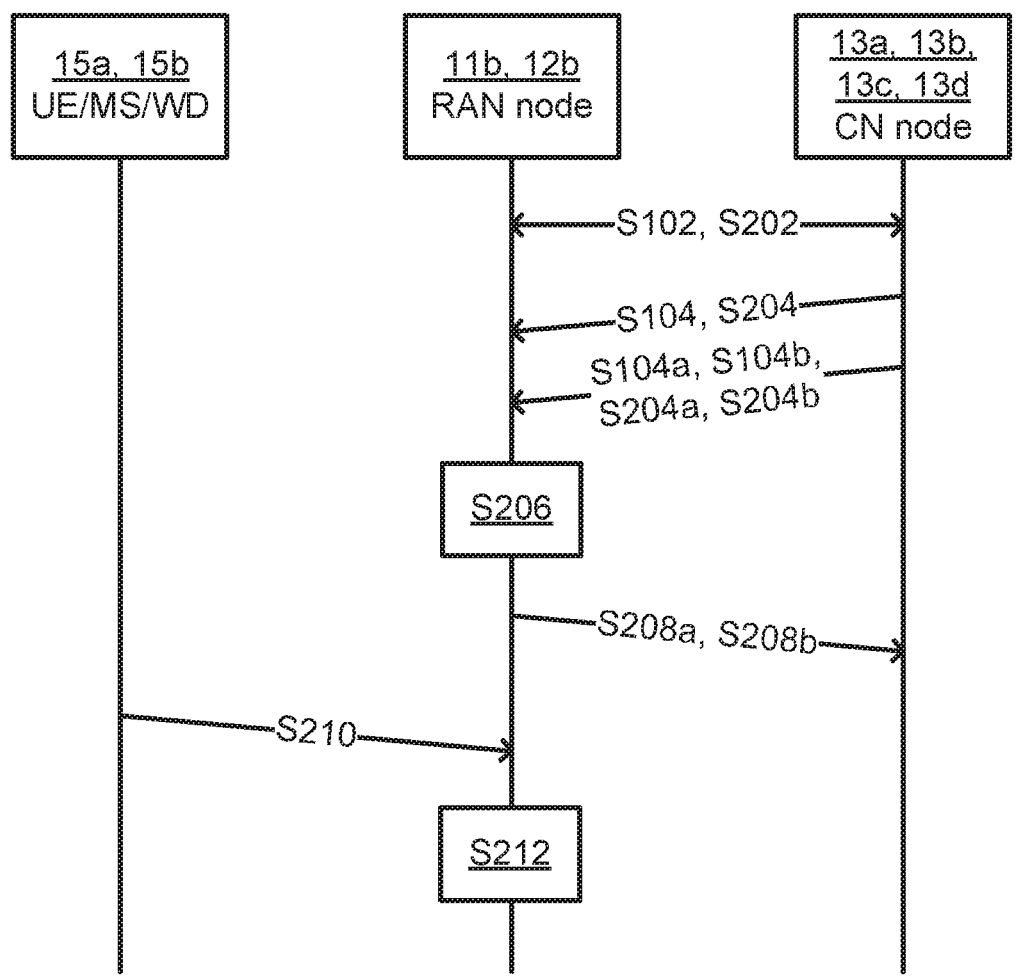
FIG. 9 is a signalling diagram of methods according to embodiments.
FIG. 10 schematically illustrates some fields of an extended feature bitmap message according to an embodiment.

For GSM in the PS domain it is possible to indicate the SGSN capability by using one of the spare bits in the Extended Feature Bitmap message. Hence, according to an embodiment the indication is provided using spare bits in an Extended Feature Bitmap message. FIG. 10 provides a schematic illustration of the fields of an Extended Feature Bitmap message 100. In general terms, the Extended Feature bitmap information element indicates the optional features supported by the underlying network service entity (NSE).

The Extended Feature Bitmap message may be sent within the BVC-RESET and BVC-RESET-ACK messages between the SGSN 13d and the BSC 12b as part of the connection setup procedure. Hence, according to an embodiment the indication is provided in a BVC-RESET message and the method further comprises an optional step S104a as follows:

S104a: The CN node 13a, 13b, 13c, 13d provides a BVC-RESET message to the RAN node. The BVC-RESET message may comprise the indication.

For GSM in the CS domain, and for WCDMA (in the CS domain and the PS domain) it is possible to introduce a new message indicating the capability of the MSC 13a, 13b and the SGSN 13c, 13d respectively. This message and corresponding acknowledge message may be sent at initialization of the node. Both the initial message and the acknowledge message may include the OCA capability indication.

Another possible way is to reuse the RESET and RESET ACKNOWLEDGE messages. These messages are currently defined to be sent only after restart of a network node (BSC 12b, RNC 11b, MSC 13a, 13b or SGSN 13c, 13d) but the BSC 12b and the RNC 11b could be required to send a RESET message also at initialization of the network node (compare with BVC-RESET). The MSC 13a. 13b and the SGSN 13c, 13d may then reply with a RESET ACKNOWLEDGE message. Thus, in this context it is in step S104a the CN node that sends the RESET and the RAN node that answers with RESET ACK. The CN node may be required to send RESET also at initialization. Both the RESET message and the RESET ACKNOWLEDGE message may include a parameter indication the OCA capability of the network node.

Thus, according to an embodiment the indication is provided in a RESET message sent during initialization, and the method further comprises an optional step S104b as follows:

S104b: The CN node 13a, 13b, 13c, 13d provides a RESET message to the RAN node 11b, 12b. The RESET message may comprise the indication.

The indication may be provided to the RAN node 11b, 12b before the CN node 13a, 13b, 13c, 13d receives any registration request via the RAN node 11b, 12b from a wireless device 15a, 15 b.

Reference is now made to FIG. 7 illustrating a method for receiving support capability of the CN node 13a, 13b, 13c, 13d as performed by the RAN node 11b, 12b according to an embodiment. Parallel reference is continued to the signalling diagram of FIG. 9.

S202: The RAN node 11b, 12b sets up a connection to a CN node 13a, 13b, 13c, 13d. Either the CN node 13a, 13b, 13c, 13d or the RAN node 11b, 12b may initiate the connection to be set up.

S204: The RAN node 11b, 12b, in response to the connection having being set up in step S202, receives an indication regarding whether the CN node 13a, 13b, 13c, 13d supports at least one of operator coordinated area (OCA) and query from the CN node 13a, 13b, 13c, 13d. According to the indication the CN node provides information to be used by the RAN node for selecting a serving operator such that the same operator is selected for the wireless device in both Circuit Switched, CS, domain and in Packet Switch, PS, domain.

S206: The RAN node stores the received indication together with identity information of the CN node 13a, 13b, 13c, 13d.

The herein disclosed embodiments thereby ensure that the RAN node (BSC 12b or RNC 11b) is provided by the CN node (SGSN 13c, 13d and MSC 13a, 13b) capability regarding if they respectively support the concept of operator coordinated area (OCA). As noted above, the capability is received already directly after setup of the connection between the network nodes. The RAN node 11b, 12b will then only apply that functionality if both the SGSN 13c, 13d and the MSC 13a, 13b support it.

Embodiments relating to further details of receiving support capability of the CN node 13a, 13b, 13c, 13d will now be disclosed.

As noted above, there are different examples of RAN nodes. For example, the RAN node may be a base station controller (BSC) 12b, or a radio network controller (RNC) 11b.

As noted above, there are different examples of CN nodes. For example, the CN node may be a serving general packet radio service support node (SGSN) 13c, 13d, or a mobile switching centre (MSC) 13a, 13b.

Reference is now made to FIG. 8 illustrating methods for receiving support capability of the CN node 13a, 13b, 13c, 13d as performed by the RAN node 11b, 12b according to further embodiments. Parallel reference is continued to the signalling diagram of FIG. 9.

There may be different ways to receive the indication. Different embodiments relating thereto will now be described in turn.

As noted above, the indication may be provided at initialization of the CN node. Additionally or alternatively the indication is provided at initialization of the RAN node.

As noted above the indication may be provided in a BVC-RESET message (step S104a) and according to an embodiment the method thus further comprises an optional step S204a as follows:

S204a: The RAN node 11b, 12b receives a BVC-RESET message from the CN node. The BVC-RESET message may comprise the indication.

The RAN node 11b, 12b may respond to the BVC-RESET message by sending a BVC-RESET-ACK message and according to an embodiment the method thus further comprises an optional step S208a as follows:

S208a: The RAN node 11b, 12b sends a BVC-RESET-ACK message to the CN node 13a, 13b, 13c, 13d. The BVC-RESET-ACK message may comprise the indication.

As noted above the indication may be provided in a RESET message (step S104b). Thus, according to an embodiment the indication is received in a RESET message sent during initialization of the CN node and the method further comprises an optional step S204b as follows:

S204b: The RAN node 11b, 12b receives a RESET message from the CN node. The RESET message may comprise the indication.

The RAN node 11b, 12b may respond to the RESET message by sending a RESET-ACK message and according to an embodiment the method thus further comprises an optional step S208b as follows:

S208b: The RAN node 11b, 12b sends a RESET-ACK message to the CN node 13a, 13b, 13c, 13d. The RESET-ACK message may comprise the indication.

The capability may by the RAN node 11b, 12b be used during registration of a wireless device 15a, 15 b. Thus, according to an embodiment the method further comprises optional steps S210 and S212 as follows:

S210: The RAN node 11b, 12b receives a registration request for a wireless device 15a, 15 b.

S212: The RAN node 11b, 12b registers the wireless device 15a, 15b based on the stored indication. In other respects the registration may follow the procedure as outlined in 3GPP TS 23.704.

The inventive concept has mainly been described above with reference to a few embodiments. However, as is readily appreciated by a person skilled in the art, other embodiments than the ones disclosed above are equally possible within the scope of the inventive concept, as defined by the appended patent claims. Additionally, although the thus far presented embodiments relate to indication of capabilities provided by the CN node 13a, 13b, 13c, 13d to the RAN node 11b, 12b, the corresponding capabilities of the CN node 13a, 13b, 13c, 13d may likewise be provided to the RAN node 11b, 12b. Further, in at least some embodiments it is always the network node (RAN node or CN node) that initiates the communication that sends the BVC-RESET message and the other network node answers with a BVC-RESET-ACK. The BVC-RESET message may thus either be sent by the RAN node 11b, 12b or the CN node 13a, 13b, 13c, 13d. Further, in at least some embodiments it is always the network node (RAN node or CN node) that initiates the communication that sends the RESET message and the other network node answers with a RESET-ACK message. The RESET message may thus either be sent by the RAN node 11b, 12b or the CN node 13a, 13b, 13c, 13d.

The invention claimed is:

1. A method for providing support capability of a core network, CN, node, the method being performed by the CN node, the method comprising:
setting up a connection to a radio access network, RAN, node at initialization of the CN node or at initialization of the RAN node;
providing, in direct response to setting up the connection, an indication regarding whether the CN node supports at least one of operator coordinated area, OCA, and query to the RAN node, according to which indication the CN node provides information to be used by the RAN node for selecting a serving operator such that the same operator is selected for the wireless device in both Circuit Switched, CS, domain and in Packet Switch, PS, domain,
wherein the RAN node applies the OCA or the query to the RAN node functionality only when the CN node and a second CN node support the functionality.

2. The method according to claim 1, wherein the RAN node is a base station controller, BSC, or a radio network controller, RNC.

3. The method according to claim 1, wherein the CN node is a serving general packet radio service support node, SGSN, or a mobile switching centre, MSC.

4. The method according to claim 1, wherein the indication is provided using spare bits in an Extended Feature Bitmap message.

5. The method according to claim 1, wherein the indication is provided in a BVC-RESET message, the method further comprising:
providing the BVC-RESET message to the RAN node.

6. The method according to claim 5, wherein the BVC-RESET-ACK message comprises the indication.

7. The method according to claim 1, wherein the indication is provided at initialization of the CN node.

8. The method according to claim 1, wherein the indication is provided at initialization of the RAN node.

9. The method according to claim 1, wherein the indication is provided in a RESET message sent during said initialization, the method further comprising:
providing the RESET message to the RAN node.

10. The method according to claim 9, wherein the RESET-ACK message comprises the indication.

11. The method according to claim 1, wherein the indication is provided to the RAN node before the CN node receives any registration request via said RAN node from a wireless device.

12. A method for receiving support capability of a core network, CN, node, the method being performed by a radio access network, RAN, node, the method comprising:
    setting up a connection to the core network, CN, node at initialization of the CN node or at initialization of the RAN node;
    receiving, in direct response to setting up the connection, an indication regarding whether the CN node supports at least one of operator coordinated area, OCA, and query from the CN node, according to which indication the CN node provides information to be used by the RAN node for selecting a serving operator such that the same operator is selected for the wireless device in both Circuit Switched, CS, domain and in Packet Switch, PS, domain;
    storing the received indication together with identity information of the CN node; and
    applying the OCA or the query from the CN node functionality only when the CN node and a second CN node support the functionality.

13. The method according to claim 12, wherein the RAN node is a base station controller, BSC, or a radio network controller, RNC.

14. The method according to claim 12, wherein the CN node is a serving general packet radio service support node, SGSN, or a mobile switching centre, MSC.

15. The method according to claim 12, further comprising:
    receiving a BVC-RESET message from the CN node.

16. The method according to claim 15, wherein the BVC-RESET message comprises the indication.

17. The method according to claim 15, further comprising:
    sending a BVC-RESET-ACK message to the CN node.

18. The method according to claim 17, wherein the BVC-RESET-ACK message comprises the indication.

19. The method according to claim 12, wherein the indication is received in a RESET message sent during the initialization of the CN node, the method further comprising:
    receiving a RESET message from the CN node.

20. The method according to claim 19, further comprising sending a RESET-ACK message to the CN node.

21. The method according to claim 20, wherein the RESET-ACK message comprises the indication.

22. The method according to claim 12, further comprising:
    receiving a registration request; and
    registering said wireless device based on the stored indication.

23. A core network, CN, node for providing support capability of the CN node, the CN node comprising a processing unit configured to:
    set up a connection to a radio access network, RAN, node at initialization of the CN node or at initialization of the RAN node;
    provide, in direct response to setting up the connection, an indication regarding whether the CN node supports at least one of operator coordinated area, OCA, and query to the RAN node, according to which indication the CN node provides information to be used by the RAN node for selecting a serving operator such that the same operator is selected for the wireless device in both Circuit Switched, CS, domain and in Packet Switch, PS, domain,
    wherein the RAN node applies the OCA or the query to the RAN node functionality only when the CN node and a second CN node support the functionality.

24. A radio access network, RAN, node for receiving support capability of a core network, CN, node, the RAN node comprising a processing unit configured to:
    set up a connection to the core network, CN, node at initialization of the CN node or at initialization of the RAN node;
    receive, in direct response to setting up the connection, an indication regarding whether the CN node supports at least one of operator coordinated area, OCA, and query from the CN node, according to which indication the CN node provides information to be used by the RAN node for selecting a serving operator such that the same operator is selected for the wireless device in both Circuit Switched, CS, domain and in Packet Switch, PS, domain;
    store the received indication together with identity information of the CN node; and
    apply the OCA or the query from the CN node functionality only when the CN node and a second CN node support the functionality.

* * * * *

UNITED STATES PATENT AND TRADEMARK OFFICE
CERTIFICATE OF CORRECTION

PATENT NO. : 10,602,561 B2
APPLICATION NO. : 15/325823
DATED : March 24, 2020
INVENTOR(S) : Wass et al.

Page 1 of 1

It is certified that error appears in the above-identified patent and that said Letters Patent is hereby corrected as shown below:

In the Specification

Column 5, Line 27, delete "13e. in" and insert -- 13e. In --, therefor.

Column 11, Line 63, delete "15 b." and insert -- 15b. --, therefor.

Column 11, Line 67, delete "15 b." and insert -- 15b. --, therefor.

Signed and Sealed this
Ninth Day of June, 2020

Andrei Iancu
*Director of the United States Patent and Trademark Office*